United States Patent [19]
Stone

[11] Patent Number: 6,032,546
[45] Date of Patent: *Mar. 7, 2000

[54] SYSTEM FOR TRANSFERRING ELECTRICAL POWER BETWEEN NON-CONTACTING ELEMENTS IN RELATIVE MOTION

[76] Inventor: Neil Stone, P.O. Box 590, Potlatch, Id. 83855

[*] Notice: This patent issued on a continued prosecution application filed under 37 CFR 1.53(d), and is subject to the twenty year patent term provisions of 35 U.S.C. 154(a)(2).

[21] Appl. No.: 09/059,203

[22] Filed: Apr. 14, 1998

Related U.S. Application Data

[60] Provisional application No. 60/053,192, Jul. 21, 1997.

[51] Int. Cl.[7] .................. G01C 19/04; H01F 27/00
[52] U.S. Cl. ........................................ 74/5.7; 307/104
[58] Field of Search ................ 439/38, 950; 336/115; 307/104; 340/310.07; 74/5.7; 191/10

[56] References Cited

U.S. PATENT DOCUMENTS

| | | |
|---|---|---|
| 3,387,606 | 6/1968 | Crafts et al. ................ 438/950 X |
| 4,610,172 | 9/1986 | Mickle et al. ................ 74/5.7 X |
| 4,891,997 | 1/1990 | Hayashi ...................... 74/5.7 X |
| 5,455,467 | 10/1995 | Young et al. ................ 307/104 |
| 5,814,900 | 9/1998 | Esser et al. ................. 307/104 |
| 5,856,710 | 1/1999 | Baughman et al. ......... 439/950 X |

*Primary Examiner*—Rodney H. Bonck
*Attorney, Agent, or Firm*—McDermott, Will, & Emery

[57] ABSTRACT

A system is provided for transmitting a.c. electrical power across a small, even gap, without any physical contact, from a primary pole system to a secondary pole system, one of which moves relative to the other. Relative movement between the pole system may be rotational as when the primary and secondary pole systems are coaxial, or may involve translational linear motion as when there is an elongate primary pole system and an elongate parallel secondary pole system. The purpose, whether the relative motion is rotational or translational, is to transfer electrical power at a controlled frequency, voltage, and current level across the gap for utilization at the relatively moving poles/elements of the system. The magnetic field across the gap between the primary and secondary pole systems is always changing in accordance with the power supplied to the primary coils and this changing field remains continuous throughout the distance traveled by the secondary poles.

41 Claims, 10 Drawing Sheets

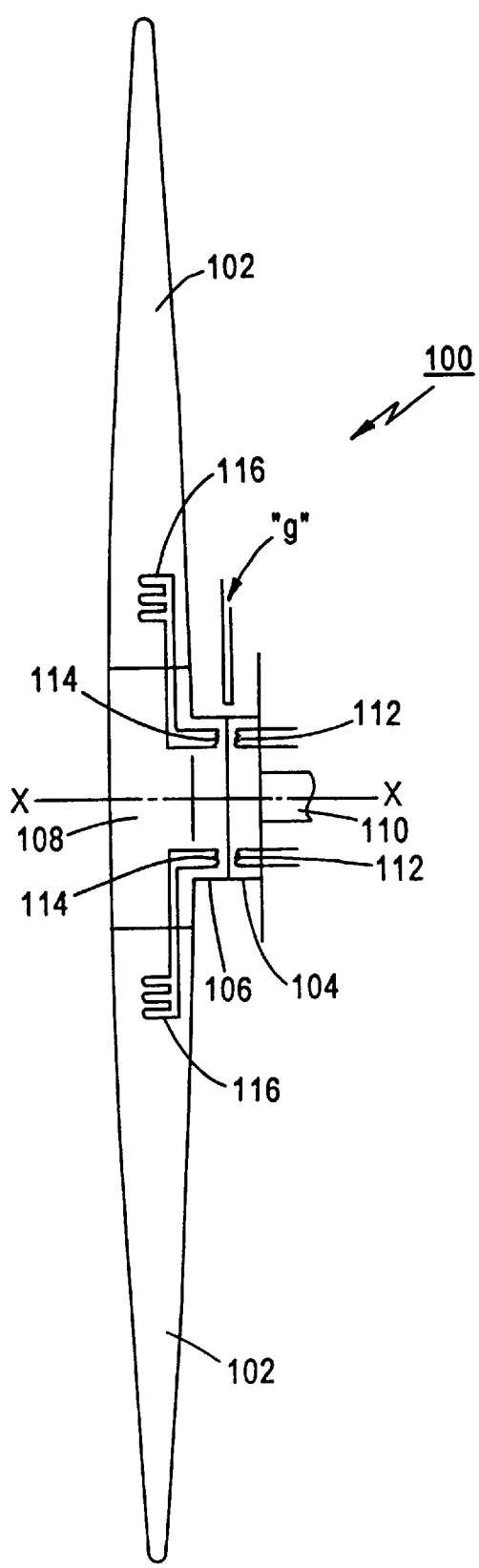
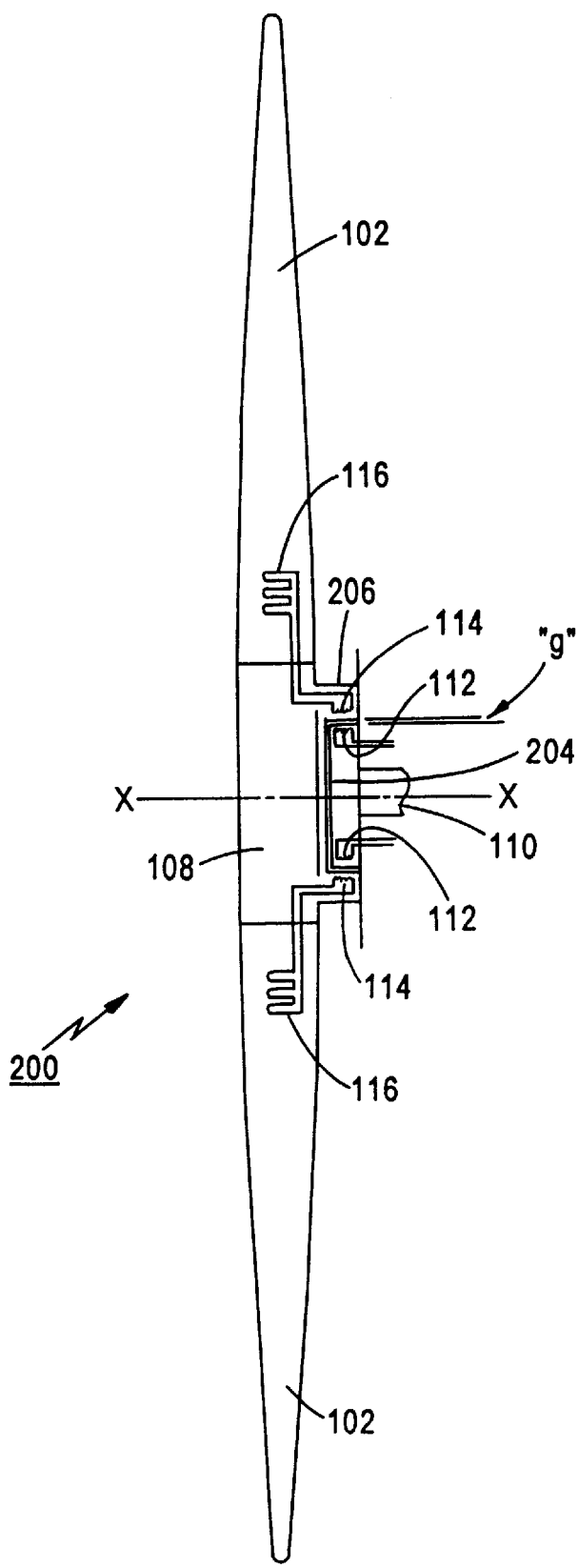
FIG. 1
FIG. 2

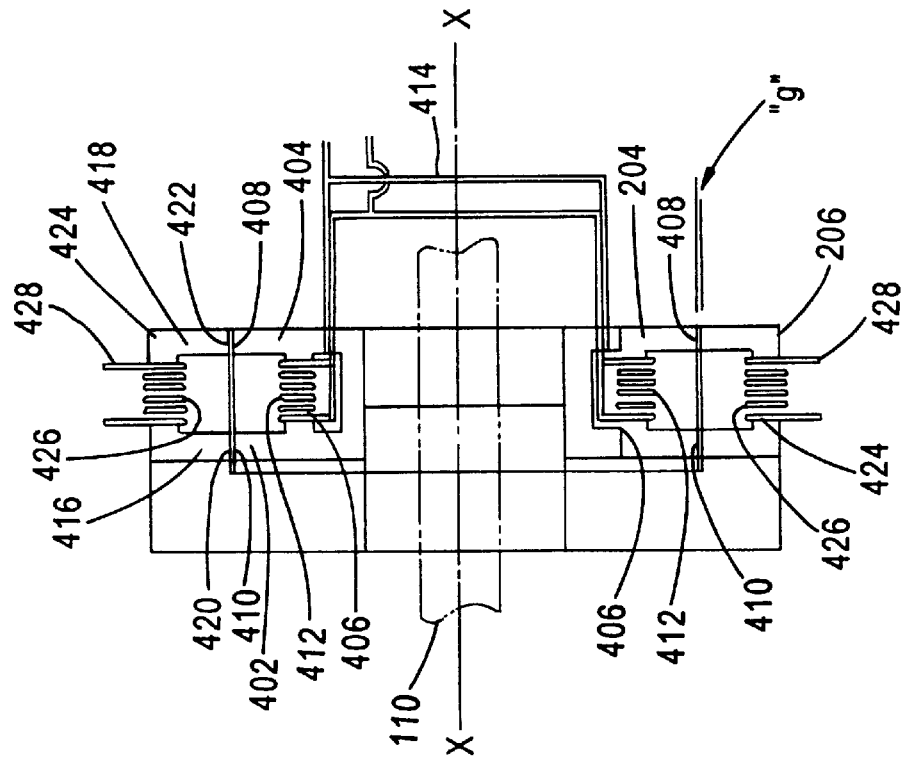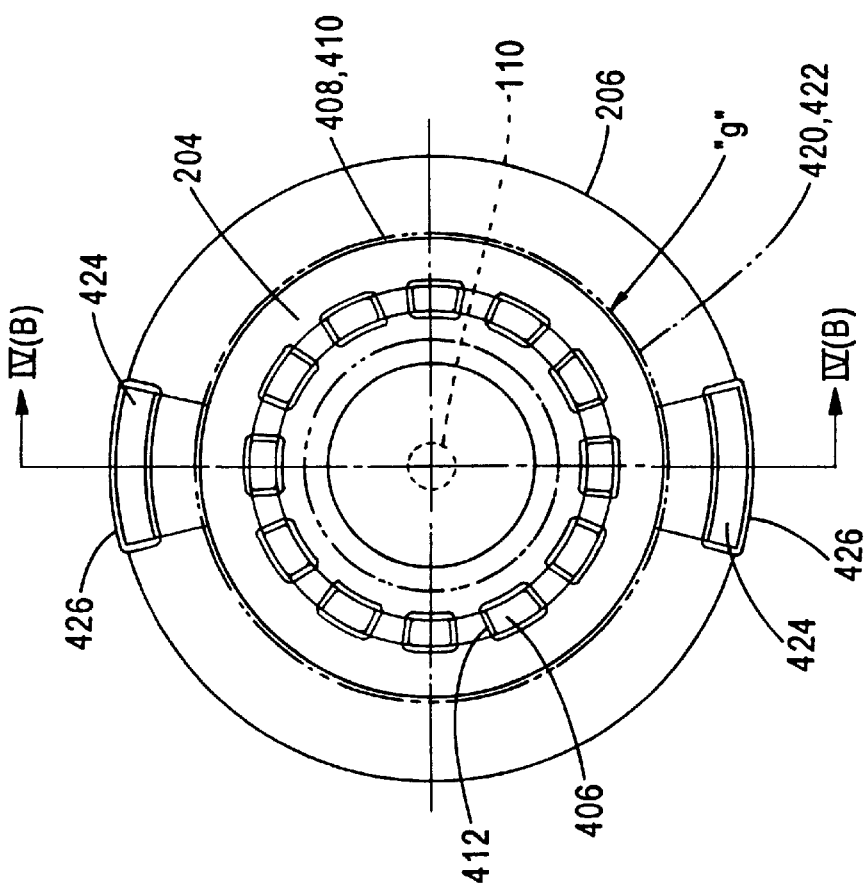
FIG. 4(B)
FIG. 4(A)

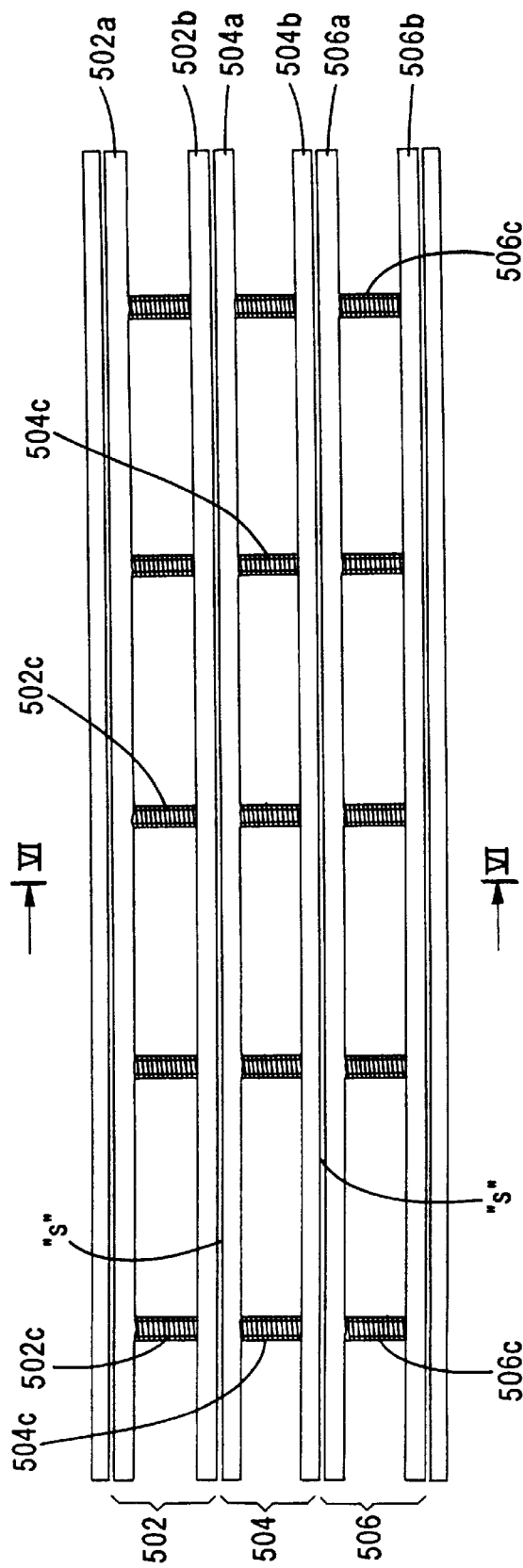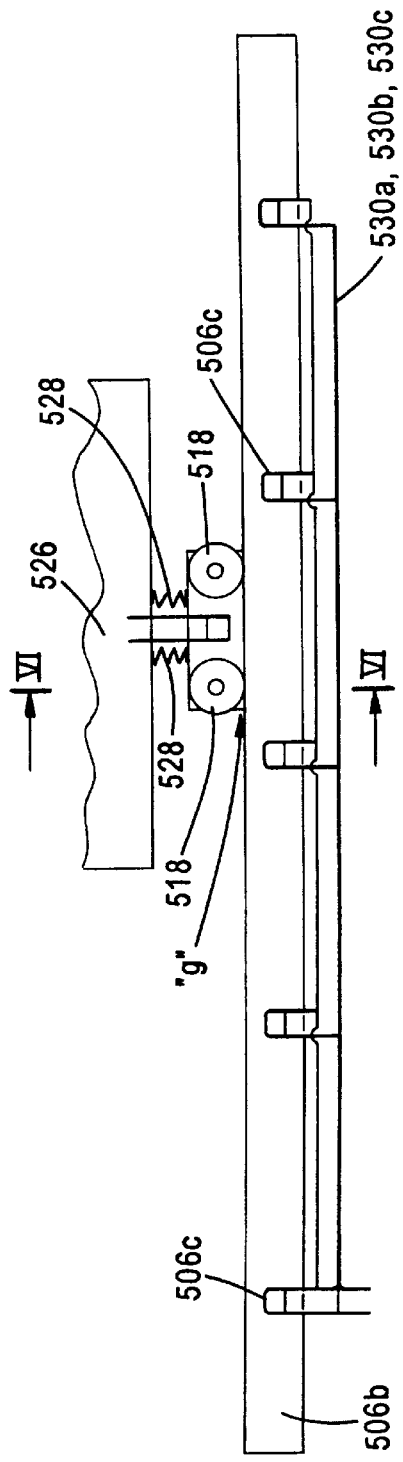

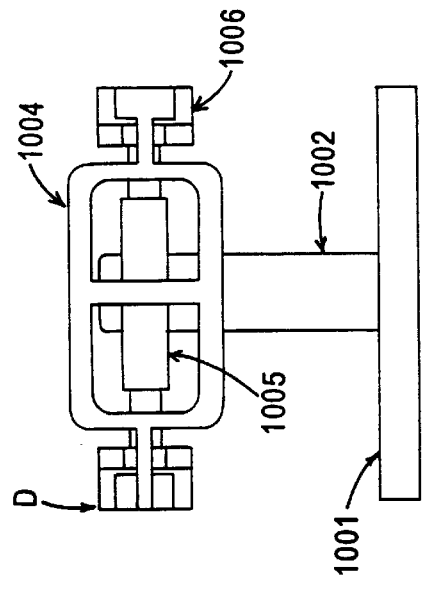
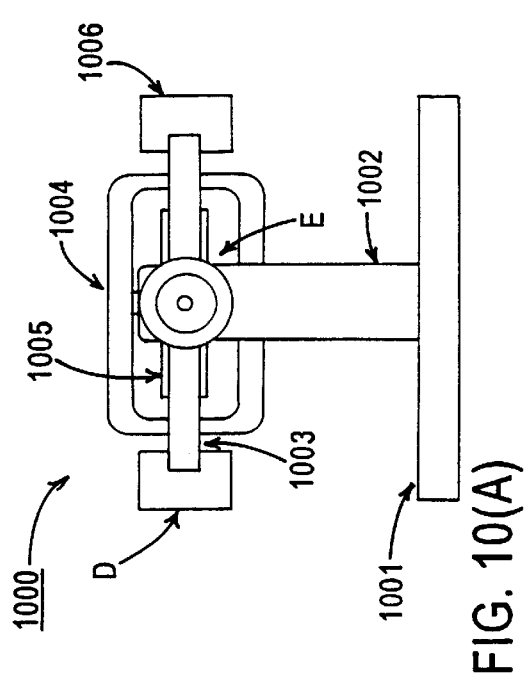
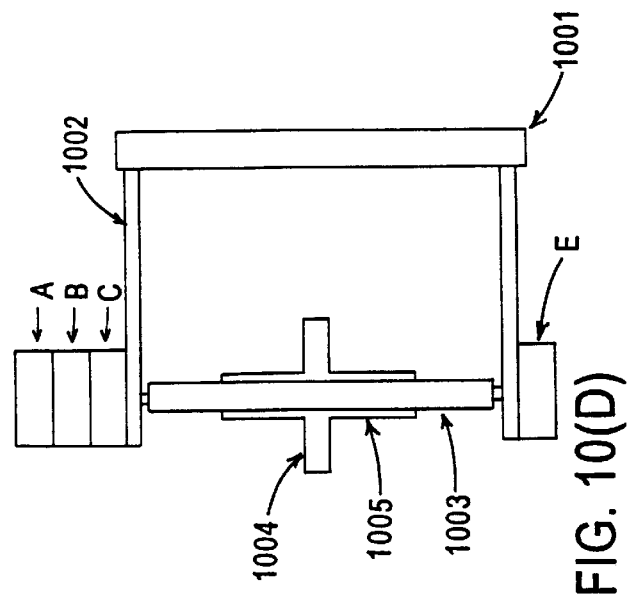
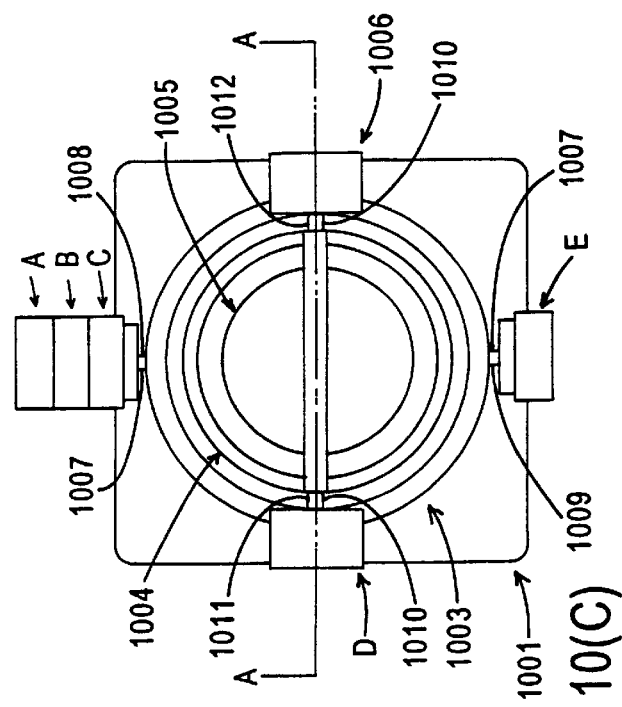

SYSTEM FOR TRANSFERRING ELECTRICAL POWER BETWEEN NON-CONTACTING ELEMENTS IN RELATIVE MOTION

RELATED APPLICATION

This application claims priority from provisional application Ser. No. 60/053,192, filed Jul. 21, 1997 and entitled "Transfer Of Electrical Power For The Purpose Of Ice Accretion Protection" which is incorporated herein by reference.

FIELD OF THE INVENTION

This invention relates to apparatus for transferring electrical power, across a gap, between non-contacting elements in relative rotational or translational motion. More particularly, this invention relates to apparatus for transferring electrical power, substantively or in a modulated form for transfer of energy, between a set of stationary poles (also termed a "pole system") and a set of poles in relative motion and separated by a predetermined small gap therefrom, without the use of conventional contacting structures such as slip-rings and the like.

BACKGROUND OF THE RELATED ART

Many systems for transferring electrical energy between objects in relative motion are known. Such systems, however, typically use brushes or wiper arms making physical contact on contact rings in rotary devices or on linear contact surfaces in devices in relative translational motion. However, there are some unavoidable problems associated with apparatus employing direct physical contact between elements in relative motion. Systems that involve direct mechanical or physical contact tend to be relatively maintenance-intensive, if only because the contact areas are susceptible to corrosion, which affects both durability and reliability and may result from the action of ambient pollutants, e.g., substances in the surrounding air, or due to intermittent sparking during relative movements during use.

The contact elements are also subject to physical wear due to friction at the relatively moving contact surfaces. Even further, where there is significant vibration between the relatively moving elements, there will be both physical wear and perhaps erosion wear due to intermittent sparking. Sparking can cause a fire hazard where flammable and volatile substances are present, as can often occur in a workshop, mine, or the like. Electrical sparking can also occur to nearby conducting objects. Furthermore, the exposed contact surfaces which are electrically charged relative to ground may create a shock hazard to personnel and electrical fire hazards due to possible shorting to adjacent conductive objects or in the presence of moisture.

There is, therefore, a need for an apparatus and a system for transferring electrical power between two objects in relative motion, without physical contact, across a defined gap between the objects, in an efficient and reliable manner. The system must be equally reliable whether the objects are in rotation or translation relative to one another. The present invention is intended to address these concerns.

SUMMARY OF THE INVENTION

Accordingly, it is a principal object of this invention to provide transfer of electrical energy between a first set of poles (alternatively, a "first pole system") and a second set of poles (alternatively, a "second pole system"), supported on respective objects in relative motion, across a defined gap therebetween and without physical contact between the sets of poles.

It is a related object of this invention to provide transfer of electrical energy between a set of stationary poles and a set of moving poles cooperating therewith, wherein the sets of poles are in either rotational or translation motion relative to each other and are separated by a defined gap, without the use of any electrical contact between the poles.

It is a further object of this invention to provide a system by which electrical energy may be transferred between a set of stationary poles and a set of moving poles in rotational or translational motion relative to the stationary poles, without the use of contacting elements, utilizing either an a.c. or a d.c. power source.

It is yet another object of this invention to provide apparatus and a system for transferring a.c. power between sets of first poles and sets of second poles in relative rotational or translational motion, wherein each of the poles comprises a plurality of cooperating coils which are electrically and magnetically isolated so that respective signals are transferred in a three-phase arrangement.

These and other related objects of this invention are realized in a first preferred embodiment by providing a system for transferring electrical energy between relatively moving objects, comprising a primary pole system including concentric inner and outer annular portions connected to each other by one or a plurality of symmetrically arranged radially extending connecting portions, with a respective primary coil wound around each radially extending connecting portion of the primary pole system and each connected to a harmonious a.c. power source. The system further comprises a secondary pole system which includes concentric inner and outer annular portions connected to each other by one or a plurality of symmetrically arranged radially extending connecting portions, wherein the annular portions of the secondary pole system are coaxial with the annular portions of the primary pole system about their common axis and are separated from the annular portions of the primary pole system by a predetermined even gap. A respective secondary coil is wound around each radially extending connecting portion of the secondary pole system and connected to an a.c. power output. The primary and secondary pole systems are in rotation relative to each other about their common axis.

In another aspect of this invention, there is provided a system for transferring electrical energy between relatively moving objects, comprising a primary pole system which includes adjacent first and second annular portions connected to each other by one or a plurality of symmetrically arranged, axially extending connecting portions, with a respective primary coil respectively wound around each axially extending connecting portion of the primary pole system and each connected to a harmonious a.c. power source. The system further comprises a secondary pole system including adjacent first and second annular portions connected to each other by one or a plurality of symmetrically arranged, axially extending connecting portions, wherein the annular portions of the secondary pole system are concentrically aligned with corresponding annular portions of the primary pole system about the central axis and are separated from them by a predetermined even gap. A respective secondary coil is wound around each of the axially extending connecting portions of the secondary pole system and connected to an a.c. output. The primary and secondary pole systems rotate relative to each other about their common axis.

In yet another aspect of this invention, there is provided a system for transfer of electrical energy between two objects in relative translational motion, the system comprising a primary pole system including paired parallel linear portions connected to each other by one or a plurality of transverse connecting portions and a primary coil respectively wound around each of the transverse connecting portions of the primary pole system and each connected to a common a.c. power source. The system includes a secondary pole which comprises paired parallel linear portions connected to each other by at least one transverse connecting portion and maintained parallel to corresponding linear portions of the primary pole system and separated therefrom by a predetermined even gap, and at least one secondary coil wound around each of the transverse connecting portions of the secondary pole system and connected to an a.c. output. At least one of the primary and secondary pole systems translates relative to the other in a longitudinal direction thereof.

BRIEF DESCRIPTION OF THE DRAWING

FIG. 1 is a schematic side view of a first preferred embodiment of this invention in an exemplary application for transferring power to a rotating propeller which includes heating elements to heat portions of propeller blades.

FIG. 2 is a schematic side view of a second preferred embodiment of this invention in a similar application for transferring power to a rotating propeller which includes heating elements to heat portions of propeller blades.

FIG. 4(A) is an end view of a primary and/or a secondary pole system of the second preferred embodiment of FIG. 2; and FIG. 4(B) is a partial cross-sectional view at section IV(B)—IV(B) in FIG. 4(A).

FIG. 5(A) is a schematic top view of a third preferred embodiment of this invention for three-phase a.c. power transfer in a different application involving relative linear movement between primary and secondary pole systems; and FIG. 5(B) is a schematic side view of a portion of the third preferred embodiment equipped with elements to provide a consistent gap between a stationary primary pole system and a relatively moving secondary pole system in the linear application according to the third embodiment.

FIGS. 10A–10D respectively indicate end, sectional, top, and side views of a gyro system utilizing electrical energy and signal transfer arrangements according to the invention.

DETAILED DESCRIPTION OF PREFERRED EMBODIMENTS

Figure 3B:
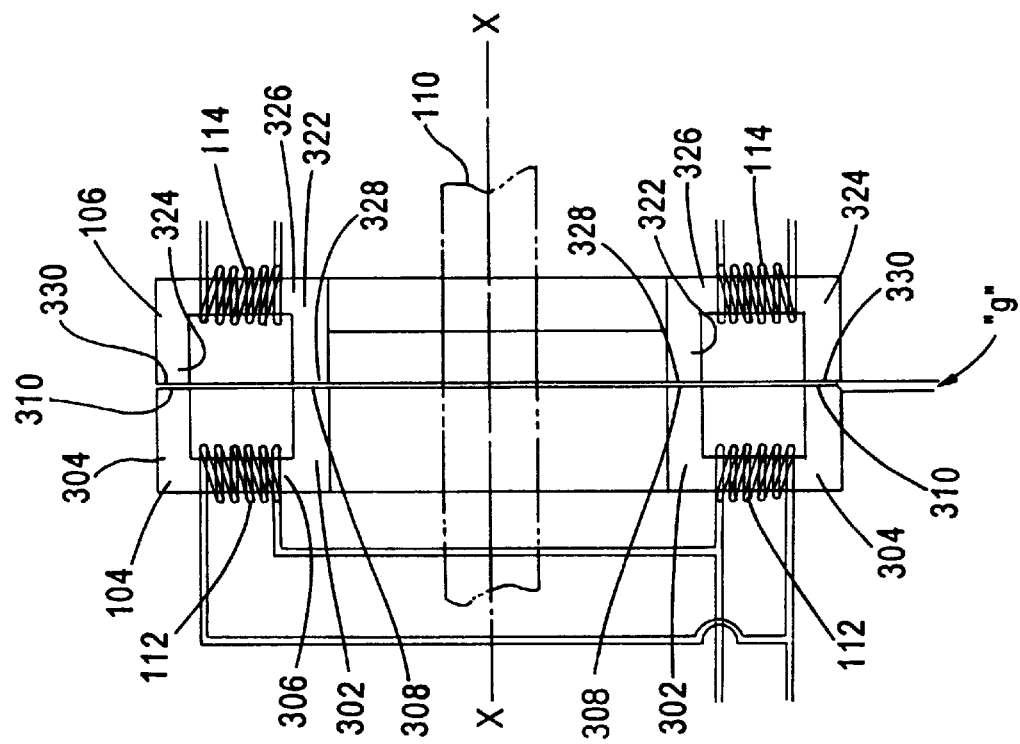
FIG. 3(B) is a partial cross-sectional view at section III(B)—III(B) in FIG. 3(A).

As best seen in FIG. 1, according to a first preferred embodiment of this invention, a system 100 for providing electrical power to a rotating airplane propeller having blades 102, 102 has a stationary primary pole system 104 immediately adjacent and opposite to a co-axial rotating secondary pole system 106 which rotates about a common axis X—X, the pole systems being spaced apart by a small predetermined even separation gap "g" The propeller blades 102, 102 are attached at their respective bases to a propeller hub 108 mounted to a propeller shaft 110 which rotates about axis X—X when supplied with power from a motor (not shown). Rotating pole 106 is co-axial with and attached to propeller hub 108 and rotates therewith.

The exact details of size and location of the propeller and propeller shaft bearings, and the manner in which fixed primary pole system 104 is supported with respect to the aircraft (not shown), are design details of a type easily resolved by persons of ordinary skill in the art. The exact nature of such details is not critical to the present invention.

Figure 3A:
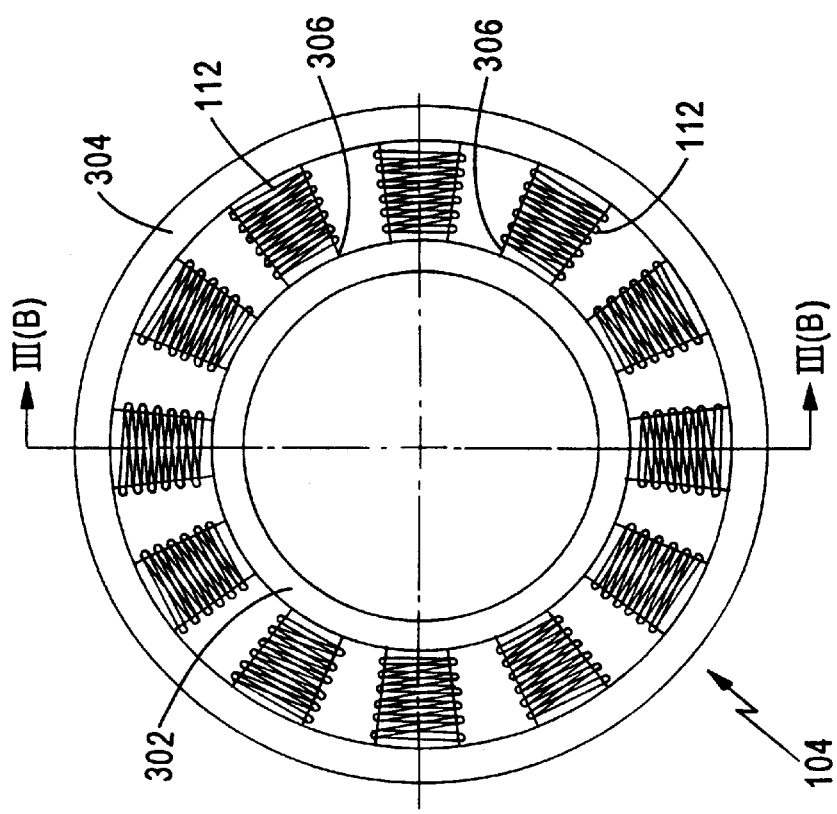
FIG. 3(A) is an end view of a primary and/or a secondary pole system of the first preferred embodiment of FIG. 1.

Structural details of stationary primary pole system 104 and rotating secondary pole system 106 are best understood with reference to FIGS. 3(A) and 3(B). The primary pole system 104 is provided with a plurality of primary coils 112, and secondary pole system 106 is likewise provided with a suitable number of secondary coils 114, as desired. An external power source (not shown) is connected, in known manner, to provide primary current to the stationary primary coils 112. Secondary coils 114, in this exemplary application, are connected to one or more resistance-type heating elements 116 (see FIGS. 1 and 2) disposed at selected locations, on or embedded within propeller blades 102, which elements rotate with the propeller. Alternatively, a sole or a plurality of additional heater elements may also be provided on or embedded within propeller hub 108, as deemed most appropriate for a particular application.

It should be understood that what is described with reference to FIGS. 1, 3A and 3B is only one example of a manner of using electrical power transferred from a stationary pole system to an adjacent rotating pole system, without physical contact, in a highly efficient manner for one preferred use, e.g., to generate heat to prevent ice formation on a rotating propeller blade under icing conditions.

Note that in the first preferred embodiment of FIG. 1 the separation gap "g" is uniform in size and even in an axial direction, i.e., a direction parallel to the propeller rotation axis X—X. The size of separation gap "g" is readily determined by appropriate engineering dimensioning of the primary and secondary poles given a particular motor/propeller arrangement. It should be understood that the exact details of how the gap is defined are matters of engineering/design choice, although it is important that the gap be evenly defined in the entire space separating the primary and secondary pole systems 104, 106 from each other during use. The essential requirement is that the stationary primary pole system and the adjacent rotating pole system be separated by as small a physical spacing as possible so long as they do not make any physical contact in use. Separation gap "g" for most foreseeable applications of this type, i.e., involving a propeller, is preferably in the range 0.0005–0.0050 in., although this range is not intended to be limiting.

Referring again to FIGS. 3A and 3B, it will been seen how both the primary and secondary pole systems according to the first embodiment for the application illustrated in FIG. 1 have generally similar shapes. As best seen in FIG. 3A, such an exemplary stationary primary pole system 104 comprises an annular inner portion 302, and a concentric, annular outer portion 304. Contiguous with both the inner and outer annular portions there is provided a plurality of radially extending connecting portions 306 preferably spaced symmetrically around the annular portion, irrespective of their number, even or odd, so as to provide for an even distribution of the magnetic field in the pole system. The exact physical dimensions and number of these radially extending connecting portions 306 are matters of design choice, are not considered critical, and may be selected as appropriate for particular applications. What is important, however, is that a sufficient number of stationary primary coils be provided, that the number of turns in each coil be determined, and the current flow through the coils be controlled, as appropriate for the transfer of the desired electrical power, depending on the a.c. voltage and current supplied by the power source.

Again, it is emphasized that the exact details of the values of various dimensions, operational parameters such as current, voltage, frequency, number of coils, etc. are all matters of design choice. Thus, a corresponding primary coil 112 is wound around each radially extending connecting portion 306, with each coil wound and connected to the other coils from the same a.c. source in such a manner that its individual magnetic field remains in harmony (i.e., having the same frequency and phase) with those generated by the other coils from that source. Suitable frequencies of the a.c. power source for the transfer of electrical energy from the primary coils to the secondary coils at a practical efficiency are as low as about 15 to 20 cycles/sec. and as high as about 100,000 cycles/sec. In aircraft applications, frequencies of about 400 cycles/sec. are preferred. Suitable frequencies for use in other applications are readily determinable by one skilled in the art.

The exact cross-sectional shape or area of each of the radially extending connecting portions 306 is not critical, and is a matter of design choice.

Primary and secondary poles 104, 106 may preferably be made of soft iron or other suitable magnetizable material, depending on the particular application to which the invention is to be put to use. The coils may be made of any known conductive material.

As best seen in FIG. 3B, the inner and outer portions 302, 304 of stationary pole system 104 have annular end faces perpendicular to the central axis X—X. These inner and outer annular faces 308, 310 enable the formation of respective annular magnetic fields bridging the gap "g" between the stationary and rotating pole systems 104, 106.

As best seen in FIG. 3B, the preferred form of the rotating secondary pole system 106 is essentially similar to that of the stationary primary pole system 104. Thus, rotating secondary pole system 106 includes an annular inner portion 322 and a concentric, annular outer portion 324. Contiguous with both portions there is provided a symmetrically arranged plurality of radially extending connecting portions 326. The inner annular portion 322 has an end face 328 directly opposite a similar end face 308 of primary pole system 104 and separated therefrom by the even gap "g". Similarly, outer portion 324 of secondary pole system 106 has an annular end face 330 immediately opposite to a similar end face 310 of the primary pole system 104 and separated therefrom by the same even gap "g".

Around the radially extending connecting portions 326 of secondary pole system 106 there are wound corresponding secondary coils 114, each wound in the same or an opposite sense to that of the stationary primary coils 112. This is best understood with reference to FIG. 3B. The opposed secondary coils 114 may be operated independently or connected to each other in a series, parallel, or any desired series-parallel arrangement and are also all connected to either or both of the heater elements 116 in the propeller application illustrated in FIG. 1.

The above-described aspects of the first preferred embodiment also include providing equal numbers of primary and secondary coils. Other modifications of this arrangement are possible, and may provide certain advantageous utilities, as described below.

In one version of the first preferred embodiment, an a.c. supply operating at a frequency of about 400 cycles/second is used to energize the primary coils 112, thereby creating an alternating primary magnetic field in the corresponding inner and outer portions 302 and 304 of primary pole 104. This is considered clearly different from known prior art systems which require either a rotating magnetic field or utilize permanent magnets or d.c. excitation coils to provide consistent, i.e., non-alternating, variously arranged magnetic field primary pole portions. These alternating primary magnetic fields are induced into the moving secondary coils 114 whose passage in the stationary alternating fields of the primary coils generates a magnetic field in each of the secondary coils 114 and produces an alternating current in the secondary coils much the same way as in an electrical transformer.

Known systems often encounter control and monitoring problems which can be serious for certain users and are best avoided. It is also possible in such known systems to encounter the problem of a counter electromotive force (emf) which is a byproduct effect that can absorb and waste otherwise utilizable engine power at the rotating propeller. Such power wastage could under certain circumstances become critical on a propeller-driven aircraft. Additionally, the fixed magnetic fields that are a part of most of the known systems could also interfere with the magnetic direction indicating systems used on all aircraft to determine the direction of flight. On other systems, a fixed primary magnetic field could create problems with magnetically sensitive devices. Even further, it is known that d.c. excited systems are generally relatively inefficient, as the primary coils would require a high direct current to energize them. Obviously, the weight of additional coils would also have a negative impact on aircraft operation and would decrease the otherwise useful load which the aircraft could carry.

It should be understood that the invention according to the first preferred embodiment as described above does not incorporate a rotating magnetic field, in contrast to other known a.c. systems, in order to eliminate the problem caused by the propeller shaft rotating in synchronism with the alternating magnetic field at the primary pole.

Note that both the inner and outer annular portions of the both the primary pole and secondary pole systems provide adjacent, spaced apart, annular, parallel end faces. This ensures that the magnetic field which alternates between the pole systems at the same rate as the exciting voltage will be of the same approximate level at any given moment for any position around the pole system. As described below, this should also be true with respect to the length of the elongated linear pole systems in a variation of this embodiment which involves relative translation between the pole systems.

Thus, in the first preferred embodiment, the magnetic field is at approximately the same gauss level along the inner and outer annular portions of the primary pole system, and this magnetic field does not travel or rotate relative to the corresponding portions of the primary pole system, but simply alternates between the poles as they are excited by the applied alternating current in the primary coils. As a result, all portions of the secondary pole system, being made of magnetizable material, will be influenced by the alternating magnetic field generated in the corresponding inner and outer pole portions irrespective of their position relative to the adjacent primary pole portions, whether the secondary pole portions are stationary or in motion in either direction of rotation relative to the primary pole portions. As a result, the frequency of the resultant current induced in the secondary coils 114 will always be the same as that of the frequency in the primary coils 112 regardless of their relative motion.

As the above-described concept can be readily applied to aviation applications as well as to other applications where it will be necessary or desirable to monitor the performance of the system, a significant advantage of the alternating voltage/current excited system over a direct voltage/current excited system is the ability to test the system prior to use and to monitor system performance while in use or in flight. This is because the amount of current flowing in the primary coils, in a properly designed system, is in direct relationship to the load being placed on the secondary pole system plus any unavoidable losses that exist, e.g., due to electrical resistance of the wiring, magnetic hysteresis losses, etc. Additionally, as the concept applies specifically to aviation applications, the alternating voltage/current system, due to its nature, cannot affect the accuracy of the aircraft magnetic compass systems. Even further, in the aviation application, with the use of only a few coils and high input current frequency, e.g., at 400 cycles/second, which is common in aircraft applications, relatively lighter magnetic materials can be used to form the primary and secondary pole systems. Consequently, such a system weighs less than the d.c. systems known in the prior art.

It should be noted that the known systems all produce a counter-emf, which is a byproduct when an electrical current is generated, as in the case of a fixed magnetic or a.c. system. Such known systems in reality generate a current rather than transfer energy in the form of a magnetic field, as is accomplished in the present invention. The present invention simply eliminates the problems associated with counter-emf since none is produced as a result of the relative motion between its primary and secondary elements.

A lesser but still significant benefit of this invention is the elimination of all friction, i.e., mechanical friction as well as electrically induced friction, whether or not the system is in use to transfer power to heat a propeller.

In short, the a.c. excited system according to the first preferred embodiment solves numerous problems encountered in known systems while retaining the benefits of reduced maintenance and improved reliability.

In the second preferred embodiment of the system, as best understood with reference to FIG. 2, the stationary primary pole system 204 and the co-axially surrounding rotating secondary pole system 206 are both concentric about a common propeller rotation axis X—X. The stationary inner or primary pole system 204, as best understood with reference to FIG. 4(B), comprises a forward annular portion 402, a parallel rearward annular portion 404, and a plurality of axially-extending contiguous connecting portions 406 therebetween. The annular portions 402 and 404 have respective cylindrical outer faces 408, 410. A plurality of stationary primary coils 412, 412 are respectively wound around corresponding axially extending connecting portions 406, 406 of primary pole system 204. Each coil is connected to a common power source (not shown). The wiring 414, for this purpose, is shown in FIG. 4B and indicates that the resultant magnetic fields produced by each coil individually are in harmony with each other and the collective magnetic field in the poles 402 and 404, respectively.

Coaxial with stationary primary pole system 204 and immediately surrounding it is the rotating secondary pole system 206 which comprises a forward annular portion 416 aligned with annular portion 402 of the primary pole system and a parallel rearward annular portion 418 aligned with annular portion 404 of the primary pole system. The annular portions 416 and 418 of rotating secondary pole system 206 have cylindrical inner faces 420, 422, respectively parallel to and surrounding counterpart cylindrical outer faces 408, 410 of the primary pole system.

The annular portions 416 and 418 of the rotating secondary pole system are contiguous with and joined to each other by an axially extending connecting portion 424 around which is wound a secondary coil 426. Each of the secondary coils is connected, directly or indirectly, to a heater element via wires 428 to provide energy to ensure against ice formation on the propeller blades in this particular application.

As will be readily appreciated, it is intended that the gap "g", which in the second preferred embodiment is measurable in a radial direction, be even between the primary and secondary pole systems 204, 206 circumferentially of their common axis X—X. A preferred range of the size of this gap "g" is 0.0005–0.0050 in. As will be appreciated, as a practical matter, it may be easier to produce the cooperating elements so that the relatively small-sized gap "g" in the second preferred embodiment is more easily realized than is the counterpart gap in the first preferred embodiment. The reason is that, in the first preferred embodiment, the gap "g" is measured in an axial direction and may vary because of the inevitable small axial play in the position of the rotating propeller relative to the stationary primary pole. Variations may occur depending on whether the propeller is loaded and is propelling the plane, whether the propeller is merely idling, or whether fuel flow to the engine powering the propeller has been reduced and the plane is gliding down to a landing. The goal, as mentioned before, is to ensure that the gap "g", whether it is measured axially or radially in the different embodiments, be kept as small a possible to ensure efficient magnetic coupling between the primary pole system and the cooperating secondary pole system. In addition, it is possible for the gap to be at any angle between the perpendicular and parallel gap arrangements illustrated in the first and second embodiments, respectively.

During operation of the second preferred embodiment, the provision of alternating current to primary coils 412 will cause the annular portions of the primary pole system to present a radially-oriented circumferentially uniform magnetic field which, by interaction with the magnetizable material of the secondary rotating pole system and the aligned disposition of the annular portions 416, 418 of the rotating secondary pole system, will cause a corresponding current to be generated in the secondary coils 426. Note that, unlike the prior art, there is no friction due to physical contact between relatively moving elements, provision and maintenance of the small evenly-sized gap "g" ensures efficient magnetic coupling between the primary and secondary pole systems, and electrical energy transfer across the gap is obtained efficiently without interfering with electrically or magnetically-sensitive components of the aircraft, e.g., its navigational system, etc.

As may be apparent, both the first embodiment, wherein the gap "g" is perpendicular to the common central axis, and the second embodiment, wherein the gap "g" is parallel to the common central axis, are susceptible of a variety of different configurations, depending upon whether each of the annular portions is continuous (i.e., the annular portion comprises a closed ring) or segmented. For example, in the embodiment shown in FIG. 4, the stationary primary pole system 204 comprises continuous annular portions 402, 404 and the rotating secondary pole system comprises partial annular (i.e. segmented) portions 416, 418. Various possible configurations for both the first (perpendicular gap) and second (parallel gap) embodiments are summarized below.

TABLE 1

| Primary Pole System | | | Secondary Pole System | | |
|---|---|---|---|---|---|
| Type | Stationary | Moving | Type | Stationary | Moving |
| Cont. | X | | Cont. | | X |
| Cont. | | X | Cont. | X | |
| Cont. | X | | Partial | | X |
| Cont. | | X | Partial | X | |
| Partial | X | | Cont. | | X |
| Partial | | X | Cont. | X | |

In addition to the possibilities offered above, further variations within the inventive concept may be realized by appropriate selection of the number of connecting portions with their respectively wound coils. For example, one energy transfer system according to the inventive concept may comprise a three coil primary pole system, with the individual poles/coils symmetrically arranged about a circle and connected in series, and a secondary pole system comprising two partial annular poles/coils which are independent of each other but utilize the same primary system. The independent secondary poles/coils may be operated in isolated fashion or connected in series, parallel, or any desired series-parallel arrangement.

In another example according to the invention, the primary and secondary pole systems are continuous, as described above, with the gap "g" parallel to the axis of rotation (i.e., as in the second embodiment). The primary pole system comprises five (5) symmetrically arranged connecting portions with their respective coils connected in parallel and the secondary pole system comprises four (4) symmetrically arranged connecting portions with their respective output coils connected in series. Thus this system illustrates the utility of the invention with systems comprising both even and odd numbers of connecting portions with respective coils and with different connection schemes for both sets of coils. Moreover, while the gap has been described as parallel to the axis of rotation, it could equally well be perpendicular to the axis of rotation and the even/odd relationship of the coils of the secondary and primary pole systems may be reversed, if desired. The important consideration according to the invention is that a configuration that adequately transfers energy between the primary and secondary pole systems be provided.

In yet another example illustrating the versatility of the present invention, the primary pole system comprises a single partial annular pole member which is the rotating component of the system. The secondary pole system is stationary and comprises an odd or even number of symmetrically arranged connecting portions with respective coils wound therearound and connected in parallel. The gap "g" may be parallel or perpendicular to the axis of rotation.

As persons of ordinary skill in the electrical arts will also appreciate, it is necessary that all magnetic connecting parts between pole pieces in the primary magnetic circuit be energized with a magnetic field that is in cooperation with the magnetic fields being produced by the other coils of the remaining connecting parts so as to reduce the losses caused by magnetic bucking when the fields are not in harmony. Additionally, when more than one coil is used in the secondary circuit, it is necessary for the outputs of coils that are connected together to be "in sync" or in phase with each other in order to obtain the maximum efficiency. It is possible to have more than one group of isolated secondary pole/coil sets utilizing a single primary pole configuration, with each secondary pole/coil group supplying a separate circuit or load having the same or different load requirements. For example, one secondary group might supply 120 v.a.c. to a heater while another secondary group supplies 230 v.a.c. to a motor, with both secondary groups utilizing a single, common primary pole system configuration and both being located on the same rotating or translational device. In certain applications, such flexibility may be particularly advantageous.

As for the coils wound around respective connecting portions of the primary and/or secondary pole systems, the direction of winding only determines which end of the coil is connected to another coil when more than one coil is utilized (as will be true in the majority of cases). It is only important that the resulting magnetic fields created by the individual coils in the primary poles be in harmony with each other in order to prevent inefficiency caused by magnetic bucking. As for the secondary coils, if they are interconnected, their outputs must also be in harmony or the resulting output voltage or current will be less than optimum. These considerations apply whether the primary and/or secondary coil configurations are in series or parallel.

As persons of ordinary skill in the electrical arts will appreciate, the transfer of electrical energy from the primary pole to the secondary pole can draw on power from an a.c. source at a selected primary frequency, and the secondary coils in either the first or second preferred embodiment will generate a useful delivered current at a corresponding frequency. Under certain circumstances, e.g., where stored power may be drawn from a bank of batteries serving as a d.c. power source, it may be necessary to employ a conventional inverter to generate an a.c. power input to the primary pole at a secondary frequency, voltage, and current. This is readily accomplished with known elements, and therefore will not be described in greater detail.

As noted earlier, employing the disclosed system in either of its above-discussed embodiments to transfer energy to heaters, to heat portions of rotating propeller blades and/or hub structure, represents only one suitable application for this invention. As can be readily visualized, in systems which have stationary and relatively rotating components, much the same kind of energy transfer across a gap, without physical contact over slip rings and the like, can be advantageously effected. One such example is the transfer of energy from a stationary conventional power source to a rotating element such as a merry-go-round, ferris wheel or other type amusement device which has lighting and/or sound generating elements supported on a rotating element of an overall system. The present invention may be utilized in such an application to transfer power across a small physical gap, without the use of slip rings or the like, to provide power to light a plurality of light bulbs on the rotating portion of e.g., the merry-go-round or ferris wheel. Numerous other such examples will no doubt occur to persons of ordinary skill in the art upon developing a proper understanding of the invention as described and claimed herein. For example, in a manufacturing system, the primary pole can be stationary and the secondary pole mounted to a rotating drum, device, or other component of the system, whereby the a.c. power output provides electrical energy to one or more electrical appliances or loads, as for example, a motor and/or heater supported by the rotating drum.

Another example of possible utility of the invention would be to transfer electrical energy to lights and/or other electrical devices used within a rotating sign or display. In such an application, the primary pole system is stationary, the secondary pole is mounted to the rotating portion of the sign or display, and the a.c. power output provides electrical energy to at least one of a light source, motor, and other electrical device(s).

Figure 6:
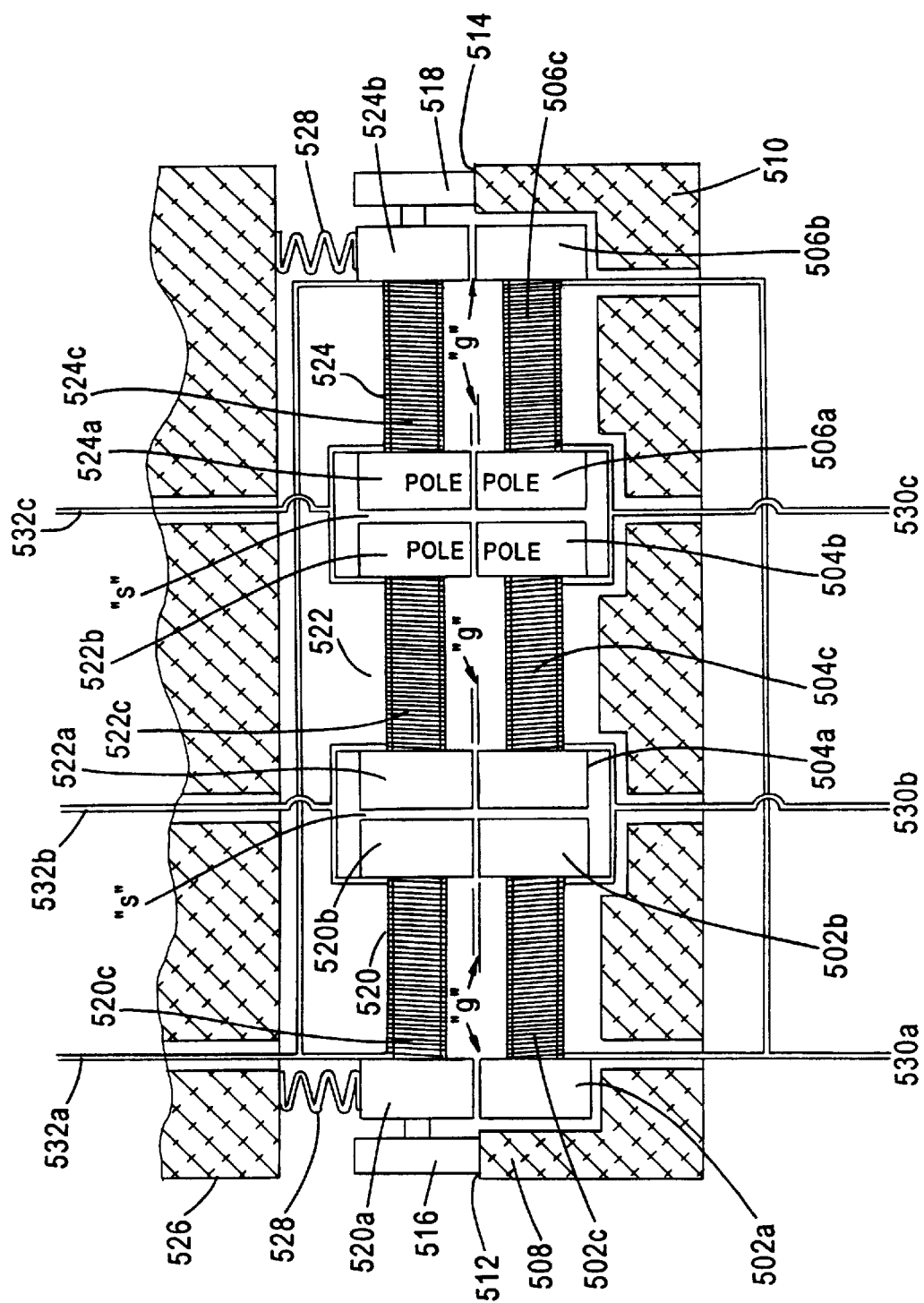
FIG. 6 is a partial cross-sectional view of the third preferred embodiment at section VI—VI in FIG. 5(B).

The present invention, in yet another form such as the third embodiment best understood with reference to FIGS. 5(A), 5(B) and 6, can be readily adapted to enable the transfer of electrical energy, across a gap without any physical contact, between stationary and relatively moving elements which move in translation. In such a third embodiment, as in both of the above-described first and second preferred embodiments which involve a rotating secondary pole system coaxial with a stationary primary pole system, the transfer of energy may be either single-phase or three-phase. In the embodiments employing rotary motion of the secondary pole system, this would require the even distribution, in multiples of three, of coils in both the primary and secondary pole systems. By contrast, in the third or translational/linear pole-type embodiment, the primary and secondary pole systems are both elongate and linear, separated from one another by a small even uniform gap "g" selected to be within the claimed general size range, i.e., 0.0005 to 0.0050 in., and with a secondary pole system provided for each of the three primary pole systems.

As best understood in the plan view of FIG. 5(A) and the cross-sectional view at Section VI—VI therein as best seen in FIG. 6, for a three-phase linear system there is provided a primary pole system comprising three parallel, linear, continuous, primary pole systems 502, 504 and 506. Each of these linear primary pole systems comprises a pair of elongate parallel pole pieces such as 502a, 502b, or 504a, 504b, or 506a, 506b, respectively. Each such pair of parallel pole pieces of each primary pole system is contiguous with a plurality of evenly spaced-apart transverse portions around which are wound respective primary coils such as 502c, 504c and 506c, respectively.

Linear primary pole systems 502, 504 and 506 are separated from each other by small mutual separations "s" which may be selected in light of the particular application. Thus, for example, if such an arrangement were employed to provide power to a traveling overhead crane, the separations "s" would of course be selected to be large enough so that ambient dirt which might contain magnetizable particles due to wear and tear of steel and iron elements would not readily bridge the separation between adjacent poles. The exact dimensions are matters of design choice and will depend strictly on the application. Persons of ordinary skill in the art can be expected to determine these as most appropriate in light of exigent circumstances.

On the outside of the above-described three-phase set of primary poles, in one particular variation of this embodiment, there is conveniently provided a pair of generally support rails or surfaces 508, 510, as best seen in FIG. 6, which have upper support surfaces 512 and 514. These support surfaces respectively support a plurality of rolling wheels 516 and 518, which in turn support a secondary pole system comprising a set of translationally moving secondary pole systems 520, 522, and 524, each comprising corresponding pairs of linear secondary pole pieces 520a and 520b, 522a and 522b, 524a and 524b, respectively, as best seen in FIG. 6. The paired pole pieces of a particular pole system are contiguous with and joined to each other via a plurality of transverse elements (not numbered) each of which has wound around it a corresponding secondary coil such as 520c, 522c, and 524c.

As will now be readily understood with reference to FIGS. 5(B) and 6, by suitable sizing and disposition of support wheels 516, 518, the entire set of secondary linear poles 520, 522, and 524 can be uniformly separated from the corresponding underlying primary pole pieces by a small, even, linear gap "g" which preferably is within the above-described size range 0.0005–0.0050 in. The principal body 526 which ultimately receives and utilizes the transmitted power could be supported by any suitable means (not shown) so as to be at an appropriate distance relative to the linear primary pole pieces. To ensure that there will be a relatively low frictional drag but consistent and sustained contact by support wheels 516, 518 with the respective underlying support surfaces 512 and 514, a plurality of compression springs 528, 528 may be provided as shown in FIGS. 5(B) and 6 to exert a continuous downward biasing force. As noted earlier, by suitable sizing of the support wheels 516, 518 and the dimensions of the other cooperating elements, it thus becomes possible to ensure that there will always be a small, even separation gap "g" between the primary poles and the secondary poles moving in translation therealong without physical contact.

Primary coils 502c, 504c, and 506c are preferably connected to each other in series as shown and are connected to wires 530a, 530b, and 530c of a three-phase a.c. power supply (not shown) of known kind. As will be readily apparent, if a single-phase power transmission variation were employed, there would be only a single linear primary pole system and a correspondingly single moving secondary pole system. The wiring to the corresponding primary coils would therefore be somewhat simpler in an obvious manner.

In similar fashion, secondary coils 520c, 522c, and 524c are connected to each other in series and via a three-phase power delivery wiring system by wires 532a, 532b, and 532c, as best seen in FIG. 6.

As with the earlier-described first and second preferred embodiments, in the third preferred embodiment a suitable a.c. power source may be utilized to provide primary power at a selected frequency, voltage, and current level, each of these parameters being controllable in known manner using known types of control elements (not shown for simplicity). This would be true whether a single-phase or a three-phase system is employed. Similarly, the transmitted power outputted via wiring 532a, 532b, and 532c, in a three-phase system, may then be conveyed to suitable end-use elements such as light bulbs, fans, or the like, on the moving portion of the system.

What is important to appreciate is that while in the first and second preferred embodiments the selection of a small even gap "g" ensured that there would be a circularly continuous primary magnetic field interacting with the moving coils of the secondary pole, in the third preferred embodiment, even as the moving pole moves linearly, there will always be a uniform linear magnetic field between the primary and secondary pole pieces. The magnetic coupling between the magnetizable materials of these pole pieces will therefore ensure that secondary coils 520c, 522c, and 524c (in the three-phase system of FIG. 6) will receive the transmitted energy to generate an output at the same frequency as the power input to the primary poles. No physical contact between the primary and secondary poles is required or desired, hence there will be no resulting friction, wear, sparking and other known types of problems of erosion and corrosion. There will be only a very small amount of frictional power loss at freely rotating support wheels 516, 518. However, these and the secondary pole structure as described above can be selected and designed so that the related power loss from the system, which degenerates to heat lost to the ambient surroundings, is kept extremely small. This ensures a very high efficiency of performance which is considered to be significantly superior to that of known prior art systems.

Figure 7:
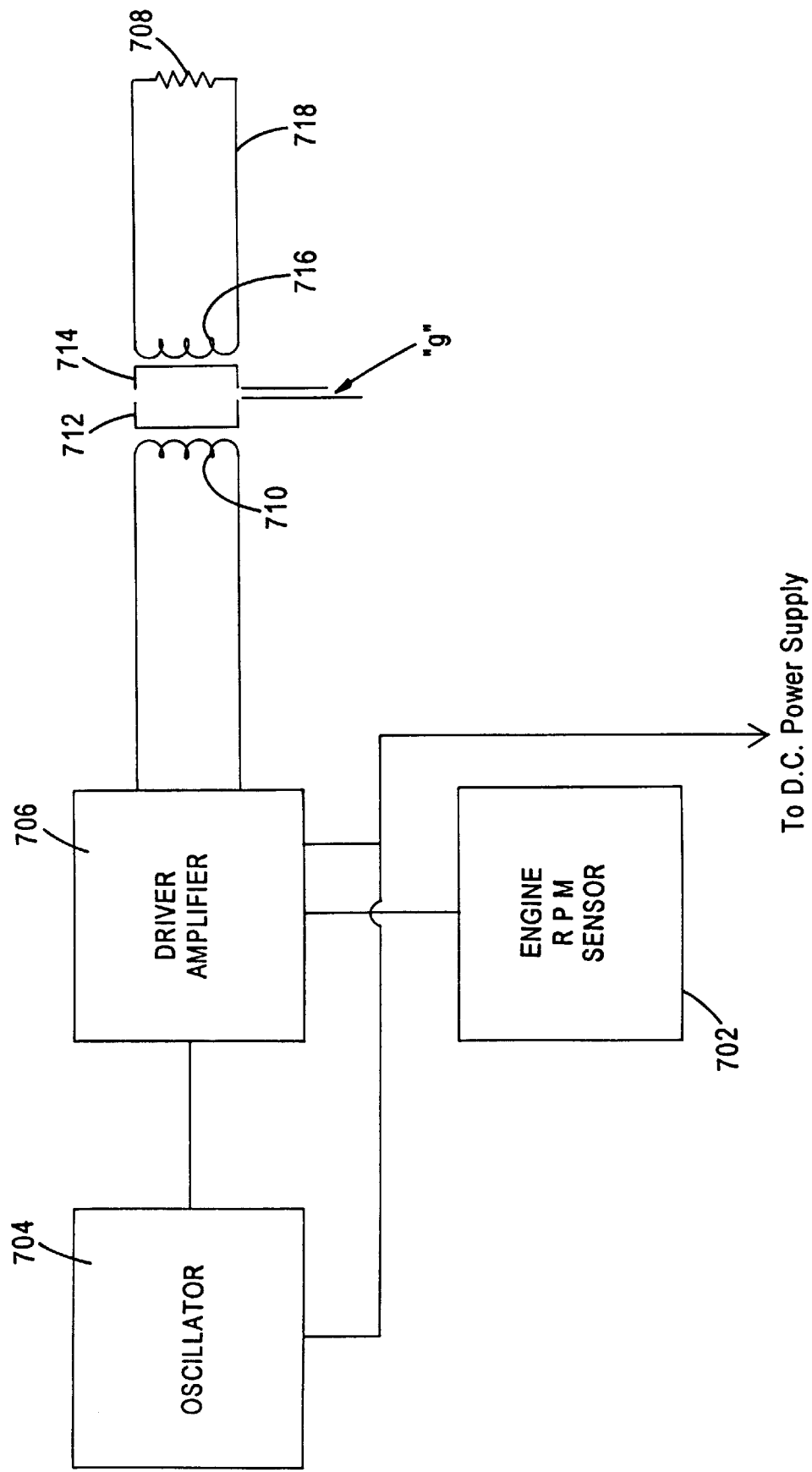
FIG. 7 is a schematic view of a circuit suitable for energizing primary coils utilizing a d.c. primary power source, including an a.c. inverter with a level control.

FIG. 7 is a schematic figure of certain elements that may be employed to ensure effective control of the system during use. With such an arrangement, the coils of the primary poles can be energized from a d.c. power source, at least in the initial stages. Thus, for example, an engine r.p.m. sensor 702, this being any known type of speed sensor, can be used to detect the speed of (for example) the rotating propeller of the first or second embodiments, and will provide a signal to a driver amplifier 706 connected to an oscillator 704 and to a d.c. power source (omitted from the drawing for simplicity) to control the energy input until the propeller picks up sufficient speed to be able to dissipate what might otherwise be a substantial supply of power to the heater elements 708. This can be accomplished by suitable selection of oscillator 704 and adjustment of driver amplifier 706 in known manner. The controlled power input to primary coils 710 will generate the desired primary magnetic field in primary pole 712 separated from moving secondary pole 714 by the above-discussed small, even, uniform gap "g". By magnetic coupling between the primary and secondary poles 712 and 714, without physical contact and associated wear/tear, the transmitted power will be provided by the secondary coils 716 via wiring 718 to heater elements 708 to warm the related propeller blade.

Figure 8:
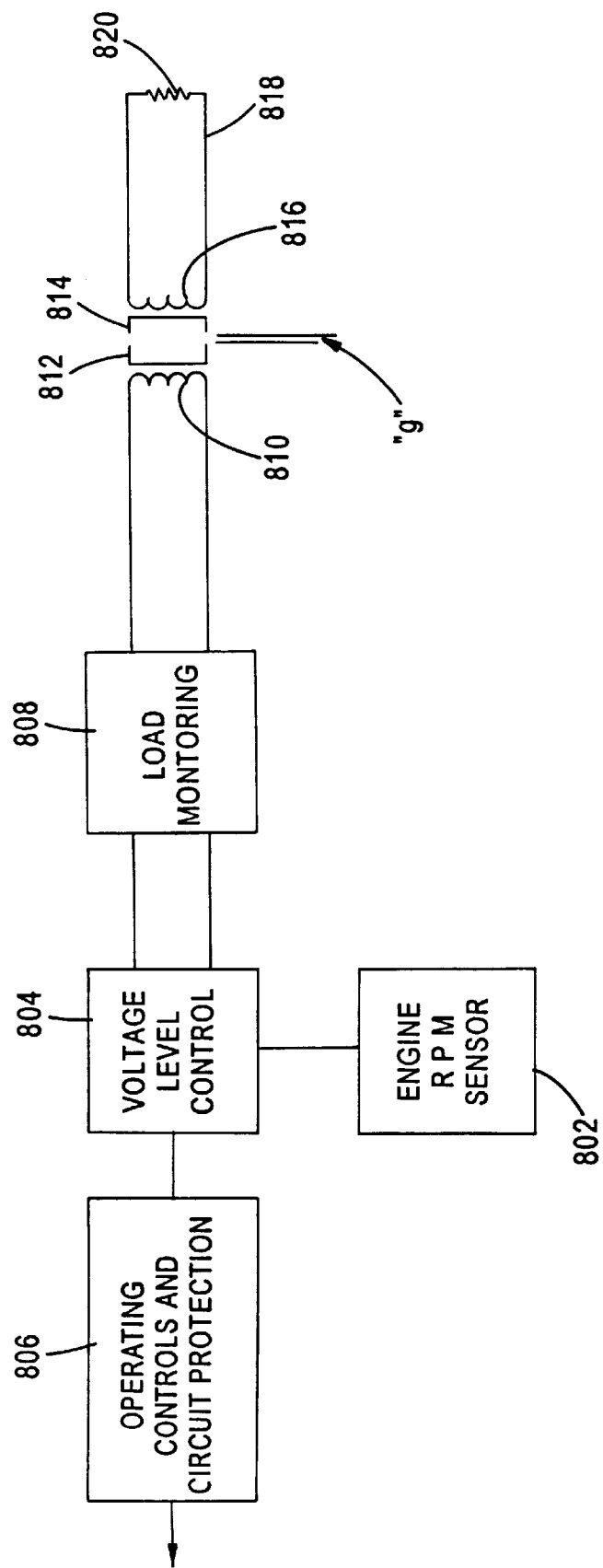
FIG. 8 is a schematic of a circuit suitable for use in an application employing the first to third preferred embodiments.

FIG. 8 is a schematic of a circuit of a type suitable for utilizing a.c. power already produced by, for example, an aircraft's other systems. The supply current to the primary pole 812 is regulated thereby to limit the output from the propeller heaters 820 as in the d.c. system described above with reference to FIG. 7. The goal is the same, i.e., to limit the amount of heat delivered by the heater elements 820 on the blades. As in the earlier-described d.c. power-supplied concept, the performance of or the load placed on the system is a function of the current flow in the primary coils 810, and therefore can be monitored with conventional a.c. ammeter-type circuits (not shown for simplicity).

Thus, in the system illustrated in FIG. 8, there will be provided a conventional engine r.p.m. sensor 802 connected to a voltage level control 804 which, in turn, is connected to operating controls and circuit protection unit 806 and to load monitoring circuit/element 808. The operating controls and circuit protection unit 806 is connected to the aircraft's other a.c. power source/supply (not shown). The load monitoring unit 808 is connected to the stationary primary coils 810 to provide a means for monitoring the system performance and may employ conventional, readily available components. The primary coils 810 generate in stationary primary pole 812 an alternating, stationary, continuous magnetic field. This magnetic field, across the small predetermined gap "g", couples with moving secondary pole 814 and thereby generates in secondary coils 816 a controlled energy output conveyed via wires 818 to heater elements 820.

Selection of commercially available elements of the type described is considered within the purview of ordinary skill in the art, as is their interconnection as indicated generally in the schematic according to FIG. 8, to obtain the desired control over either a d.c. or an a.c. power supply to ensure that the heater elements in the propeller, or any other applications portions of the system, are not overburdened and do not burn out. Such end-use aspects, while relevant, are not critical to the present invention and therefore are not described in greater detail.

Figure 9:
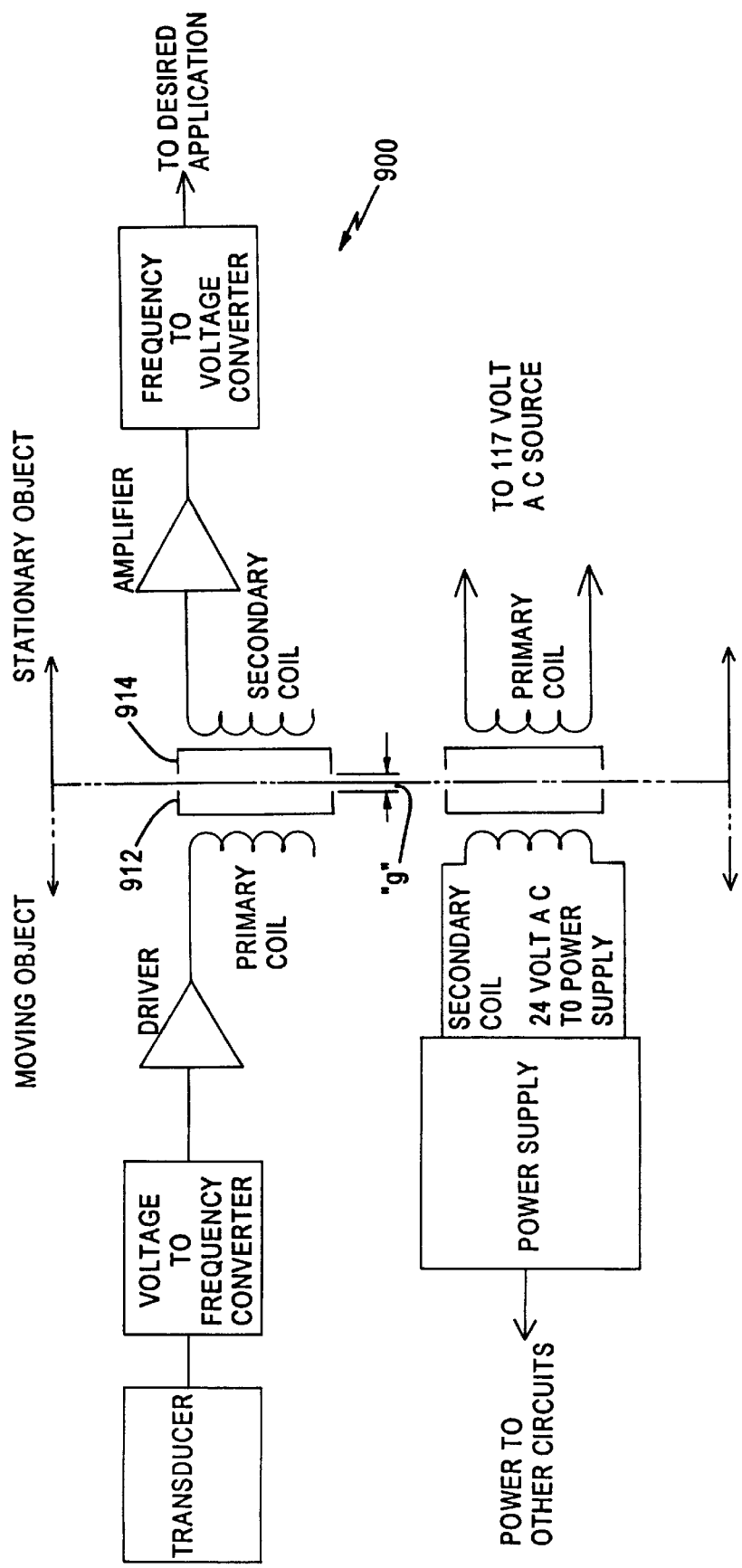
FIG. 9 is a schematic view of a circuit adapted to transfer signals from one device to another according to a fourth embodiment of this invention.

As schematically illustrated in FIG. 9, the present invention can be utilized to transfer signals generated by an electrical device on the relatively moving component, and the cooperating secondary attached to the relatively stationary component. Such signals can be used, for example, for monitoring and/or control purposes. The schematic circuit 900 of FIG. 9 should therefore be regarded only as exemplary and is illustrated merely to explain the principle and not a particular specific application. With the circuit schematically illustrated in FIG. 9, for example, a carrier signal can be varied by amplitude, by frequency, or by both. If the amplitude is to be varied, allowance must be made for possible variation in gap "g" if the resultant secondary signal requires precision and the gap cannot be precisely controlled. If the carrier signal is varied by frequency, then variations in the gap space, i.e., in the dimension of the gap "g", should not be a predominant factor. Additionally, this exemplary schematic circuit is intended to demonstrate that the so-called primary poles 912 need not be confined to a stationary device, but may also be part of the moving device and are therefore only related to the source of the electrical energy or signal, and the secondary coils/poles 914 would then be related to the electrical load, which also is stationary. An additional feature of this figure is that it indicates how to convey energy between the primary and secondary coils/poles at different voltage levels. In other words, it is possible and may even be desirable to either step-up or step-down the received voltage in the secondary coil, depending on a specific application, an additional advantage possible with this invention.

A further example of the wide spectrum of applicability of the inventive concept is shown in FIGS. 10A–10D, wherein a system involving stationary components and components moving in relation thereto, e.g. a gyroscope system, utilizes a plurality of systems as above described to provide both electrical energy and signal transfer. More specifically, FIGS. 10A–10D respectively indicate end, sectional, top, and side views of a gyro system adapted to include five induction rings. FIG. 10B is a sectional view taken along line A—A of FIG. 10C.

As shown therein, gyro system 1000 includes a mounting platform 1001 for supporting gyro mounting frame 1002. Outer gimbal 1003, inner gimbal 1004, and gyro 1005 are provided within mounting frame 1002 in conventional manner. Tandemly arranged "induction rings" A, B, and C each comprising primary/secondary pole systems as hereinabove described are provided at one end 1008 of the rotational axis 1007 of the outer gimbal 1003 such that the primary pole system of each is stationary and the secondary pole system of each rotates along with axis 1007. A similarly configured induction ring E is provided at the opposite end 1009 of axis 1007; however, in this instance the induction ring is provided such that the secondary pole system is stationary and the primary pole system rotates along with axis 1007.

In addition to the above described induction rings A–C and E, the primary pole system of induction ring D of similar configuration is mounted to or otherwise attached to the outer gimbal 1003 to move therewith, while the secondary pole system thereof is provided at one end 1011 of the rotational axis 1010 of the inner gimbal 1004 so as to rotate therewith. In such an arrangement, the primary pole system of induction ring D is attached to the outer gimbal at an angle of about 90° relative to its rotational axis. Completing the arrangement is position sensor 1006 mounted to the other end 1012 of rotational axis 1010 of inner gimbal 1004. Position sensor 1006 provides a signal indicative of the relative positions of the rotational axes between the inner and outer gimbals. Not shown (for reasons of simplicity) is an additional position sensor used to indicate the relative rotational position of the outer gimbal to the mounting frame, as is conventional in some gyro systems.

Figure 11:
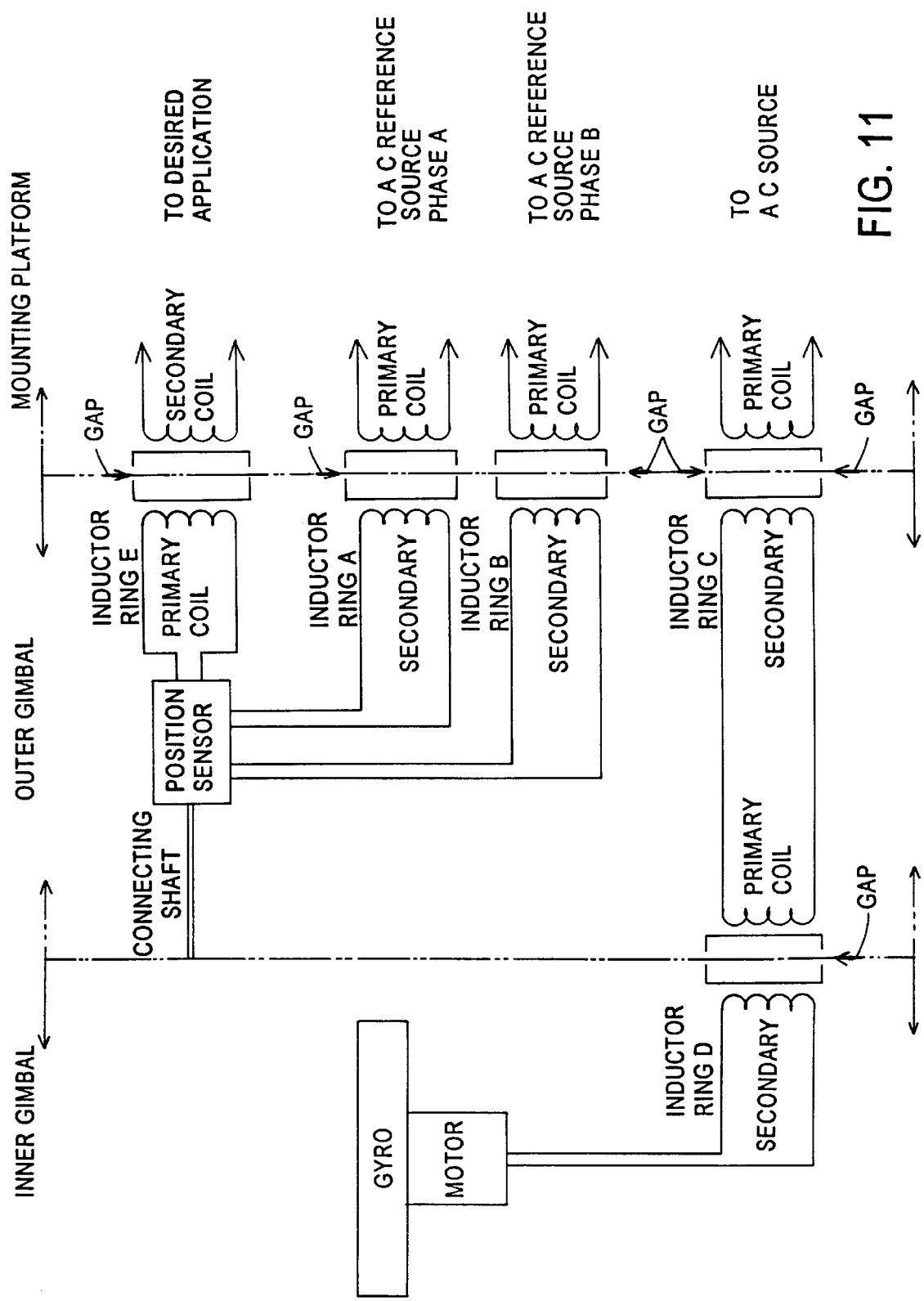
FIG. 11 is a schematic view of a circuit adapted to transfer electrical energy and signals in the gyro system of FIG. 10.

FIG. 11 is a schematic circuit diagram illustrating the interconnection of the various inductor rings and gyro components for effecting transfer of electrical energy and transmission of electrical signals using the multiple inductor ring arrangement described above. As may be evident therefrom, power is supplied to an electric motor operating the gyro through two separate sets of primary/secondary pole systems (induction rings C and D) each located on a different axis (90° apart) of the outer gimbal by connecting the output of the first induction ring C to the input of the second induction ring D so as to transfer energy across two independently rotating parts, i.e., the inner and outer gimbals, of a single device. More specifically, a.c. electrical power is inputted to inductor ring C via its primary pole system, transferred across a first gap to the secondary pole system of inductor ring C, supplied in turn to the primary pole system of inductor ring D, transferred across a second gap to the secondary pole system of inductor ring D, and finally supplied to an electrical motor to operate the gyro.

In addition to the above transfer of power for effecting motion, the system provides for excitation of position sensor 1006 by two phase power supplied through two additional inductor rings A and B. The output signal or indication from the sensor is applied to the primary pole system (moving) of inductor ring E for transfer across the associated gap to the secondary pole system (stationary) and thence to a desired location, e.g. an instrument panel.

A particular advantage of the use of inductor rings of the invention in such applications as typified by the above example is the elimination of friction inherent in the use of slip rings conventionally employed for such purpose. In addition, replacement of the slip rings will eliminate the errors caused by friction and improve accuracy of the gyro system. In addition, it may be desirable to utilize, as needed, any of the previously disclosed possible combinations of induction ring configurations, i.e., parallel and/or perpendicular, as well as continuous or partial annular combinations. Determination of a particular configuration most appropriate for a specific application is considered within the purview of one of ordinary skill in the electrical arts.

It is reiterated that the above-described exemplary circuits, geometries and applications are not intended to be limiting. The above description is intended to clarify and explain how a variety of choices of geometry (e.g., the first and second preferred embodiments) may be considered for a particular application such as the provision of heat to prevent icing of propeller blades. Even further, the above-described examples are intended to be only illustrative of modifications, e.g., the linear application of the third preferred embodiment. Obvious variations of these will no doubt occur to persons of ordinary skill in the art. Finally, the illustrative schematic circuits shown herein similarly are not intended to be limiting but are intended to merely illustrate selected examples of the utility of the present invention with known elements.

Although the present invention has been described and illustrated in detail, it should be clearly understood that the same is by way of illustration and example only and is not to be taken by way of limitation, the spirit and scope of the present invention being limited only by the terms of the appended claims.

What is claimed is:

1. A system for transferring electrical energy between relatively moving objects, comprising:

a primary pole system comprising concentric inner and outer annular portions connected to each other by one or a plurality of symmetrically arranged radially extending portions;

a primary coil, respectively wound around each of the radially extending portions of the primary pole system and each connected to an a.c. power source;

a secondary pole system comprising concentric inner and outer annular portions connected to each other by one or a plurality of symmetrically arranged radially extending portions, the annular portions of the secondary pole system being coaxial with the annular portions of the primary pole system about a common axis and separated from the annular portions of the primary pole system by a predetermined even gap; and a secondary coil, respectively wound around each of the radially extending portions of the secondary pole system and each connected to an a.c. power output, wherein at least one of the primary and secondary pole systems rotates relative to the other about the common axis.

2. The system according to claim 1, wherein:

the inner and outer annular portions of the primary and secondary pole systems end in respective planes perpendicular to the common axis, and the even gap therebetween provides a predetermined axial separation between the primary and secondary pole systems.

3. The system according to claim 1, wherein:

one of the primary and secondary pole systems is stationary while the other rotates coaxially relative thereto.

4. The system according to claim 3, wherein:

the primary pole system is stationary.

5. The system according to claim 1, wherein:

the primary pole system comprises continuous inner and outer annular portions; and the secondary pole system comprises continuous inner and outer annular portions.

6. The system according to claim 1, wherein:

the primary pole system comprises continuous inner and outer annular portions; and the secondary pole system comprises one or a plurality of symmetrically arranged inner and outer partial annular portions.

7. The system according to claim 1, wherein:

the primary pole system comprises one or a plurality of symmetrically arranged inner and outer partial annular portions; and the secondary pole system comprises continuous inner and outer annular portions.

8. The system according to claim 1, wherein:

the primary pole system is stationary, the secondary pole system is adapted for mounting to a ferris wheel, merry-go-round, or other amusement device, and in use the a.c. power output provides energy to at least one of light generating elements, sound generating elements, motors, and other electrical devices supported by the ferris wheel, merry-go-round, or other amusement device.

9. The system according to claim 1, wherein:

the primary pole system is stationary, the secondary pole system is adapted to be mounted to a rotating drum or other device in a manufacturing, system, and in use the a.c. power output provides electrical energy to at least one of a motor, a heater, and other electrical devices supported by the rotating drum or other device.

10. The system according to claim 1, wherein:

the primary pole system is stationary, the secondary pole system is adapted to rotate with a propeller, and in use the a.c. power output provides electrical energy to at least one heating element mounted to or within the propeller.

11. The system according to claim 1, wherein:

the primary pole system is stationary, the secondary pole system is adapted to be mounted to the rotating portion of a rotating display sign, and in use the a.c. power output provides electrical energy to at least one of a light, motor, and other electrical device.

12. The system according to claim 1, wherein:

the a.c. power source provides an electrical current to the primary coil(s) at a frequency selected to transfer electrical energy to the secondary coil(s) at a practical efficiency, which frequency is in the range of from about 15 cycles/sec. to about 100,000 cycles/sec.

13. The system according to claim 12, wherein:

the frequency is about 400 cycles/sec.

14. The system according to claim 12, further comprising:

a level control for limiting, the a.c. power source in a variable manner to thereby control a corresponding value of a.c. current available at the a.c. power output connected to the secondary coil(s).

15. The system according to claim 1, further comprising:

a rectifier element connected to the a.c. power output to provide a d.c. rectified power output therefrom.

16. The system according to claim 1, further comprising:

an inverter element connected to a d.c. power source to receive a direct current therefrom and convert it into an alternating current to serve as the a.c. power source.

17. The system according to claim 16, wherein:

the inverter element comprises a level control to limit the alternating current output in a variable manner to thereby control a corresponding value of an alternating current available at the a.c. power output connected to the secondary coil(s).

18. A gyro system comprising a plurality of electrical energy transferring systems according to claim 1, comprising:

a mounting platform supporting thereon a gyro mounting frame;

an outer gimbal, an inner gimbal, and a gyro element each mounted within said gyro mounting frame; and a motor for energizing the gyro; the gyro system further comprising:

a first primary pole system affixed to the mounting frame;

a first cooperating secondary pole system affixed to a first end of a first axis of a first one of the gimbals;

a second primary pole system affixed to a second axis of the first gimbal;

a second cooperating secondary pole system affixed to a first end of an axis of the other gimbal;

wire means electrically connecting the first cooperating secondary pole system to the second primary pole system; and wire means electrically connecting the second cooperating secondary pole system to said gyro energizing motor; whereby a.c. power applied to the first primary pole system is transferred to the gyro energizing motor in a contactless manner.

19. A gyro system according to claim 18, further comprising:

first and second additional primary pole systems affixed to said mounting frame, with their respective cooperating secondary pole systems affixed to said first end of said first axis of said first gimbal, said first and second additional primary pole systems respectively connected to a.c. reference voltages of differing phase;

a third additional primary pole system affixed to a second end of said first axis of said first gimbal, with its respective additional cooperating secondary pole system affixed to the mounting frame;

a position sensor affixed to a second end of said axis of said other gimbal;

wire means connecting the cooperating secondary pole systems to said position sensor for supplying said reference a.c. voltages of differing phase thereto; and wire means electrically connecting the output of said position sensor to said third additional primary pole system, whereby an output signal of said position sensor is transferred in a contactless manner to said third additional cooperating secondary pole system for use in a desired application.

20. A system for transferring electrical energy between relatively moving objects, comprising:

a primary pole system comprising coaxial first and second annular portions connected to each other by one or a plurality of symmetrically arranged, axially extending connecting portions disposed around a central axis;

a primary coil, respectively wound around the each of the connecting portions of the primary pole system and each connected to an a.c. power source;

a secondary pole system comprising coaxial first and second annular portions connected to each other by one or a plurality of symmetrically arranged, axially extending connecting portions, the annular portions of the secondary pole system being radially aligned with corresponding annular portions of the primary pole system about the central axis and separated therefrom by a predetermined even gap; and a secondary coil respectively wound around each of the connecting portions of the secondary pole system and each connected to an a.c. power output, wherein at least one of the primary and secondary pole systems rotates relative to the other about the common axis.

21. The system according to claim 20, wherein:

the coaxial first and second annular portions of each of the primary and secondary pole systems end in respective cylindrical surfaces parallel to the common axis, and the even gap therebetween provides a predetermined radial separation between the primary and secondary pole systems.

22. The system according to claim 20, wherein:
one of the primary and secondary pole systems is stationary while the other rotates coaxially relative thereto.

23. The system according to claim 20, wherein:
the primary pole is stationary.

24. The system according to claim 20, wherein:
the primary pole system comprises continuous coaxial first and second annular portions; and
the secondary pole system comprises continuous coaxial first and second annular portions.

25. The system according to claim 20, wherein:
the primary pole system comprises continuous coaxial first and second annular portions; and
the secondary pole system comprises one or a plurality of symmetrically arranged coaxial first and second partial annular portions.

26. The system according to claim 20, wherein:
the primary pole system comprises one or a plurality of symmetrically arranged coaxial first and second annular portions; and
the secondary pole system comprises continuous coaxial first and second annular portions.

27. The system according to claim 20, wherein:
the primary pole system is stationary, the secondary pole system is adapted for mounting to a ferris wheel, merry-go-round, or other amusement device, and in use the a.c. power output provides energy to at least one of light generating elements, sound generating elements, motors, and other electrical devices supported by the ferris wheel, merry-go-round, or other amusement device.

28. The system according to claim 20, wherein:
the primary pole system is stationary, the secondary pole system is adapted to be mounted to a rotating drum or other device in a manufacturing system, and in use the a.c. power output provides electrical energy to at least one of a motor, a heater, and other electrical devices supported by the rotating drum.

29. The system according to claim 20, wherein:
the primary pole system is stationary, the secondary pole system is adapted to rotate with a propeller, and in use the a.c. power output provides electrical energy to at least one heating element mounted to or within the propeller.

30. The system according to claim 20, wherein:
the primary pole system is stationary, the secondary pole system is adapted to be mounted to the rotating portion of a rotating display sign, and in use the a.c. power output provides electrical energy to at least one of a light, motor, and other electrical device.

31. The system according to claim 29, wherein:
the a.c. power source provides an electrical current to the primary coil(s) at a frequency selected to transfer electrical energy to the secondary coil(s) at a practical efficiency, which frequency is in the range of from about 15 cycles/sec. to about 100,000 cycles/sec.

32. The system according to claim 31, wherein:
the frequency is about 400 cycles/sec.

33. The system according to claim 31, further comprising:
a level control limiting the a.c. power source in a variable manner to thereby control a corresponding value of A.C. current available at the a.c. power output connected to the secondary coil(s).

34. The system according to claim 20, further comprising:
a rectifier element connected to the a.c. power output to provide a d.c. rectified power output therefrom.

35. The system according to claim 20, further comprising:
an inverter element connected to a d.c. power source to receive a direct current therefrom and convert it into an alternating current to serve as the a.c. power source.

36. The system according to claim 20, wherein:
the inverter comprises a level control to limit the alternating current output in a variable manner to thereby control a corresponding value of an alternating current available at the a.c. power output connected to the secondary coil(s).

37. A gyro system comprising a plurality of electrical energy transferring systems according to claim 20, comprising:
a mounting platform supporting thereon a gyro mounting frame;
an outer gimbal, an inner gimbal, and a gyro element each mounted within said gyro mounting frame; and
a motor for energizing the gyro; the gyro system further comprising:
a first primary pole system affixed to the mounting frame;
a first cooperating secondary pole system affixed to a first end of a first axis of a first one of the gimbals;
a second primary pole system affixed to a second axis of the first gimbal;
a second cooperating secondary pole system affixed to a first end of an axis of the other gimbal;
wire means electrically connecting the first cooperating secondary pole system to the second primary pole system; and
wire means electrically connecting the second cooperating secondary pole system to said gyro energizing motor, whereby a.c. power applied to the first primary pole system is transferred to the gyro energizing motor in a contactless manner.

38. A gyro system according to claim 37, further comprising:
first and second additional primary pole systems affixed to said mounting frame, with their respective cooperating secondary pole systems affixed to said first end of said first axis of said first gimbal, said first and second additional primary pole systems respectively connected to a.c. reference voltages of differing phase;
a third additional primary pole system affixed to a second end of said first axis of said first gimbal, with its respective additional cooperating secondary pole system affixed to the mounting frame;
a position sensor affixed to a second end of said axis of said other gimbal;
wire means connecting the cooperating secondary pole systems to said position sensor for supplying said reference a.c. voltages of differing phase thereto; and
wire means electrically connecting the output of said position sensor to said third additional primary pole system, whereby an output signal of said position sensor is transferred in a contactless manner to said third additional cooperating secondary pole system for use in a desired application.

39. A system for transferring electrical energy between relatively moving objects, comprising:

a primary pole system comprising paired, parallel linear portions connected to each other by one or a plurality of transverse connecting portions;

a primary coil, respectively wound around each of the transverse connecting portions of the primary pole system and each connected to an a.c. power source;

a secondary pole system comprising paired, parallel linear portions connected to each other by at least one transverse connecting portion and maintained parallel to corresponding linear portions of the primary pole system and separated from the primary pole system by a predetermined even gap; and at least one secondary coil wound around the at least one transverse connecting portion of the secondary pole system and connected to an a.c. power output, wherein at least one of the primary and secondary pole systems translates relative to the other in a longitudinal direction thereof.

40. The system according to claim 39, further comprising:

a gap-maintaining mechanism, resiliently mounted to one of the primary and secondary pole systems so as to bias the same toward the other of the pole systems.

41. The system according to claim 40, wherein:

the gap-maintaining mechanism is spring-mounted to the secondary pole system and comprises a plurality of rotating wheels sized to maintain the gap at a selected value.

* * * * *